(12) United States Patent
Cao et al.

(10) Patent No.: US 11,947,157 B2
(45) Date of Patent: Apr. 2, 2024

(54) BACKLIGHT MODULE AND DISPLAY DEVICE

(71) Applicants: HKC CORPORATION LIMITED, Shenzhen (CN); BEIHAI HKC OPTOELECTRONICS TECHNOLOGY CO., LTD., Beihai (CN)

(72) Inventors: Taixin Cao, Shenzhen (CN); Hsu Kang Lo, Shenzhen (CN); Haoxuan Zheng, Shenzhen (CN)

(73) Assignees: HKC CORPORATION LIMITED, Shenzhen (CN); BEIHAI HKC OPTOELECTRONICS TECHNOLOGY C0., LTD., Beihai (CN)

( * ) Notice: Subject to any disclaimer, the term of this patent is extended or adjusted under 35 U.S.C. 154(b) by 0 days.

(21) Appl. No.: 17/875,795

(22) Filed: Jul. 28, 2022

(65) Prior Publication Data
US 2023/0032182 A1 Feb. 2, 2023

(30) Foreign Application Priority Data

Jul. 29, 2021 (CN) .......................... 202110867925.6

(51) Int. Cl.
*F21V 8/00* (2006.01)
(52) U.S. Cl.
CPC .......... *G02B 6/009* (2013.01); *G02B 6/0068* (2013.01); *G02B 6/0078* (2013.01)

(58) Field of Classification Search
CPC ..... G02B 6/009; G02B 6/0068; G02B 6/0078
See application file for complete search history.

(56) References Cited

FOREIGN PATENT DOCUMENTS

| CN | 101858545 A |   | 10/2010 |             |
|----|-------------|---|---------|-------------|
| CN | 102177393 A | * | 9/2011  | ........... G02B 6/0073 |
| CN | 202501399 U | * | 10/2012 |             |
| CN | 202581169 U | * | 12/2012 |             |

(Continued)

OTHER PUBLICATIONS

First Office Action issued in counterpart Chinese Patent Application No. 202110867925.6, dated Jan. 27, 2022.

(Continued)

*Primary Examiner* — Mary Ellen Bowman
(74) *Attorney, Agent, or Firm* — Westbridge IP LLC (57) ABSTRACT

Disclosed are a backlight module and a display device. The backlight module includes a plurality of lamp boards and a backplane. The backplane has a lamp board installation side. The lamp boards are spliced at the lamp board installation side to form a light-emitting area. A fastener is provided between two adjacent lamp boards and has a first end and an opposite second end. The first end has a first connecting structure, and two opposite sides of the second end are respectively provided with a first limit portion and a second limit portion. A second connecting structure corresponding to the first connecting structure is arranged on the lamp board installation side. The fastener is connected and fixed on the lamp board installation side through the first connecting structure and the second connecting structure. The first and second limit portions are respectively abutted against sides of the two adjacent lamp boards.

16 Claims, 8 Drawing Sheets

(56) References Cited

FOREIGN PATENT DOCUMENTS

| CN | 207301560 U | | 5/2018 | | |
|---|---|---|---|---|---|
| CN | 209674139 U | | 11/2019 | | |
| CN | 209765946 U | | 12/2019 | | |
| CN | 210720954 U | | 6/2020 | | |
| CN | 212255959 U | | 12/2020 | | |
| CN | 112596303 A | * | 4/2021 | ....... | G02F 1/133308 |
| CN | 112596303 A | | 4/2021 | | |
| EP | 3282184 A1 | * | 2/2018 | ................ | F16B 2/22 |
| TW | 201039017 A | | 11/2010 | | |
| WO | WO-2012125605 A2 | * | 9/2012 | ........... | C07D 239/42 |

OTHER PUBLICATIONS

Second Office Action issued in counterpart Chinese Patent Application No. 202110867925.6, dated Apr. 15, 2022.

* cited by examiner

BACKLIGHT MODULE AND DISPLAY DEVICE

CROSS-REFERENCE TO RELATED APPLICATIONS

The present disclosure claims priority to Chinese Patent Application No. 202110867925.6, which is entitled "BACKLIGHT MODULE AND DISPLAY DEVICE" and filed on Jul. 29, 2021, the entirety content of which is incorporated herein by reference.

TECHNICAL FIELD

The present application relates to the field of display technology, in particular to a backlight module and a display device.

BACKGROUND

The backlight module is an important component of the display device and provides a light source for the display device. The backlight module comprises a backplane and a lamp board mounted on the backplane. Limited by the lamp board's printing ability, the size of the lamp board is limited. When to manufacture large-size backlight modules, it is necessary to splice and fix several small-size lamp boards on the backplane. For the existing large-size backlight modules, when to splice and assemble multiple lamp boards on the backplane, it is inconvenient to assemble the lamp boards on the splicing side.

The above content is to assist in understanding the technical solution of the present application, and does not mean that the above content is recognized as related art.

SUMMARY

The main purpose of the application is to provide a backlight module and a display device, which aims to solve the technical problem of inconvenient assembly of multiple lamp panels on the splicing sides on the backplane in the related art.

In order to achieve the above purpose, the backlight module proposed in the application includes: backlight module, comprising:

a backplane having a lamp board installation side; and a plurality of lamp boards spliced at the lamp board installation side to form a wherein there are a fastener between two adjacent lamp boards, the fastener having a first end and a second end opposite to the first end, the first end of the fastener having a first connecting structure, and two opposite sides of the second end of the fastener being respectively provided with a first limit portion and a second limit portion;

wherein a second connecting structure corresponding to the first connecting structure is arranged on the lamp board installation side, the fastener is connected and fixed on the lamp board installation side through the first connecting structure and the second connecting structure, and the first limit portion and the second limit portion are respectively abutted against sides of the two adjacent lamp boards on both sides of the fastener to restrict the sides of the two adjacent lamp boards on both sides of the fastener from moving away from the backplane.

Optionally, the lamp board installation side is provided with a groove corresponding to the second connecting structure, the second connecting structure is arranged in the groove, and the first connecting structure and the second connecting structure are connected and fixed in the groove.

Optionally, the first connecting structure comprises:

a mounting panel arranged at the first end of the fastener and provided with a mounting hole; and a bolt adapted to the mounting hole, wherein the second connecting structure is a threaded hole arranged on the lamp board installation side, the threaded hole is adapted to the bolt, and the bolt is threaded with the threaded hole after passing through the mounting hole to connect and fix the fastener on the mounting side of the lamp board.

Optionally, the mounting panel and the first limit portion are on a same side of the fastener.

Optionally, the mounting hole is outside a vertical projection of the first limit portion on the mounting panel.

Optionally, the fastener includes:

a fixing body clamped between the two adjacent lamp boards, wherein the fixing body has a first end and a second end opposite to the first end, the first end of the fixing body is provided with the first connecting structure, two opposite sides of the second end of the fixing body are respectively formed with the first limit portion and the second limit portion, and the fixing body is respectively abutted against the corresponding sides of the two adjacent lamp boards on both sides of the fixing body to restrict a movement of the two adjacent lamp boards towards the fixing body.

Optionally, the fixing body is a panel-shaped body, and butting sides of the fixing body and the two adjacent lamp boards are perpendicular to the lamp board installation side.

Optionally, the two opposite sides of the second end of the fixing body are respectively folded to form a first folding structure and a second folding structure, the first folding structure is the first limit portion, and the second folding structure is the second limit portion.

Optionally, all the lamp boards are provided with lamp beads, and all the lamp beads in the light-emitting area are evenly distributed.

The display device proposed in the present application includes a display module, a fixing frame and the above backlight module. The display module and the backlight module are installed on the fixing frame, and the lamp boards emits light towards the display module.

In the embodiments of the present application, after the fastener is connected and fixed with the second connecting structure on the lamp board installation side through the first connecting structure on the fastener, the first limit portion and the second limit portion on the fastener are respectively abutted against the sides of the lamp boards on both sides of the fastener, and the lamp boards on both sides of the fastener are fixed by the same fastener between the two, which can reduce the number of fasteners and the times of assembling the fasteners. It is easier to assemble the splicing sides of two adjacent lamp boards.

BRIEF DESCRIPTION OF THE DRAWINGS

In order to more clearly explain the embodiments of the application or the technical solutions in the related art, the following will briefly introduce the drawings that need to be used in a description of the embodiments or the related art. It is obvious that the drawings in the following description are only some embodiments of the application. For those skilled in the art, other drawings can be obtained according to the structure shown in these drawings without paying creative work.

The realization, functional characteristics and advantages of the purpose of the present application will be further explained with reference to the drawings in conjunction with the embodiments.

DETAILED DESCRIPTION OF THE EMBODIMENTS

The technical solutions in the embodiments of the application will be described clearly and completely below in combination with the drawings in the embodiments of the application. Obviously, the described embodiments are only part of the embodiments of the application, not all of the embodiments. Based on the embodiments in the application, all other embodiments obtained by those skilled in the art without making creative work fall within the protection scope of the application.

It should be noted that all directional indications (such as up, down, left, right, front and rear . . . ) in the embodiments of the application are only used to explain the relative position relationship and movement between components under a specific posture (According to the attached drawings). If the specific posture changes, the directional indications will change accordingly.

In the present application, unless otherwise specified and limited, the terms "connection", "fixation" and the like shall be understood in a broad sense. For example, "fixation" can be a fixed connection, a detachable connection, or an integral part. It can be a mechanical connection or an electrical connection. It can be a direct connection or an indirect connection through an intermediate medium. It can be the connection between two elements or the interaction relationship between two elements, unless otherwise expressly defined. For those skilled in the art, the specific meaning of the above terms in the application can be understood according to the specific circumstances.

In addition, if there is a description of "first", "second" and the like in the embodiment of the application, the description of "first", "second" and the like is only for the purpose of description, and cannot be understood as indicating or implying its relative importance or implicitly indicating the number of indicated technical features. Therefore, the features defined by "first" and "second" may explicitly or implicitly include at least one of the features. In addition, the meaning of "and/or" in the full text includes three parallel schemes. Taking "A and/or B" as an example, it includes scheme A, or scheme B, or both schemes A and B. In addition, the technical solutions of the various embodiments can be combined with each other, but must be based on the realization by those skilled in the art. When the combination of the technical solutions is contradictory or impossible, it shall be considered that the combination of the technical solutions does not exist and is not within the scope of protection required by the application.

According to the backlight module 13 and the display device 10 proposed in the present application, the assembly of multiple lamp boards 100 spliced on the backplane 300 on the splicing side is easier.

According to FIGS. 1 to 4, in the first embodiment of the backlight module 13 proposed in the application, the backlight module 13 includes a plurality of lamp boards 100 and a backplane 300, the backplane 300 has a lamp board mounting side 310. All the lamp boards 100 are spliced at the lamp board mounting side 310 to form a light-emitting area. A fastener 200 is provided between two adjacent lamp boards 100. The fastener 200 has a first end 201 and a second end 202 opposite to the first end 201. The first end 201 of the fastener 200 is provided with a first connecting structure 240. Two opposite sides of the second end 202 of the fastener 200 are respectively provided with a first limit portion 210 and a second limit portion 220.

A second connecting structure 320 corresponding to the first connecting structure 240 is arranged on the lamp board installation side 310, the fastener 200 is connected and fixed to the lamp board installation side 310 through the first connecting structure 240 and the second connecting structure 320, and the first limit portion 210 and the second limit portion 220 are respectively abutted against corresponding sides of the lamp boards 100 on both sides of the fastener 200, to restrict the corresponding sides of the lamp boards 100 on both sides of the fastener 200 from moving away from the backplane 300.

The first limit portion 210 and the second limit portion 220 can be abutted against the corresponding side edges of the lamp boards 100 on both sides of the fastener 200 respectively, and clamp and fix the abutted lamp boards 100 with the backplane 300.

The second connecting structure 320 is a one-sided connecting structure, that is, it only needs to be connected and fixed with the first connecting structure 240 at the lamp board installation side 310 where the second connecting structure 320 is set. The first connecting structure 240 and the second connecting structure 320 can be mutually matched snap structures, structures of threaded hole and bolt 242, bonding structures, or the like.

Figure 1:
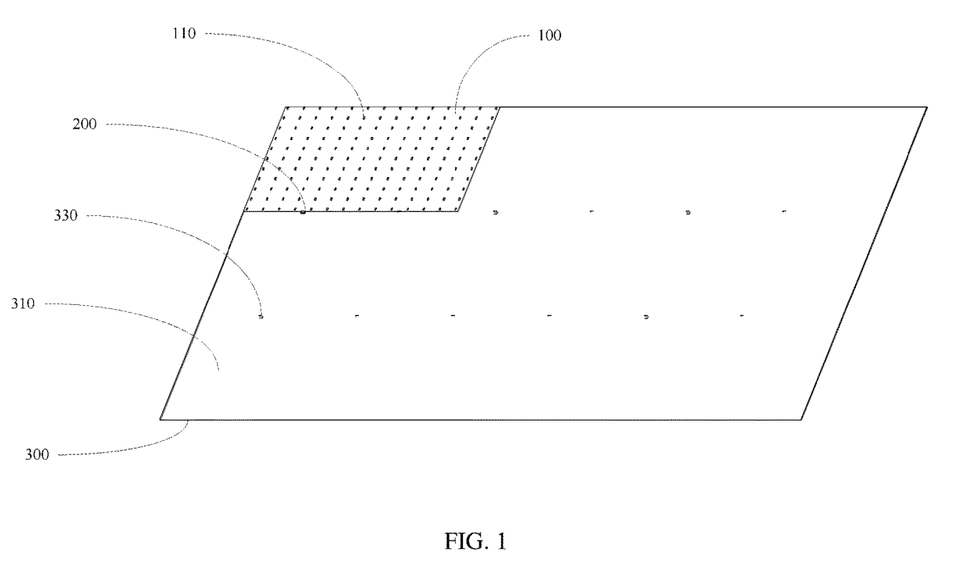
FIG. 1 is a schematic diagram of one lamp board assembled on the backplane in a first embodiment of the backlight module proposed in the present application.
Figure 2:
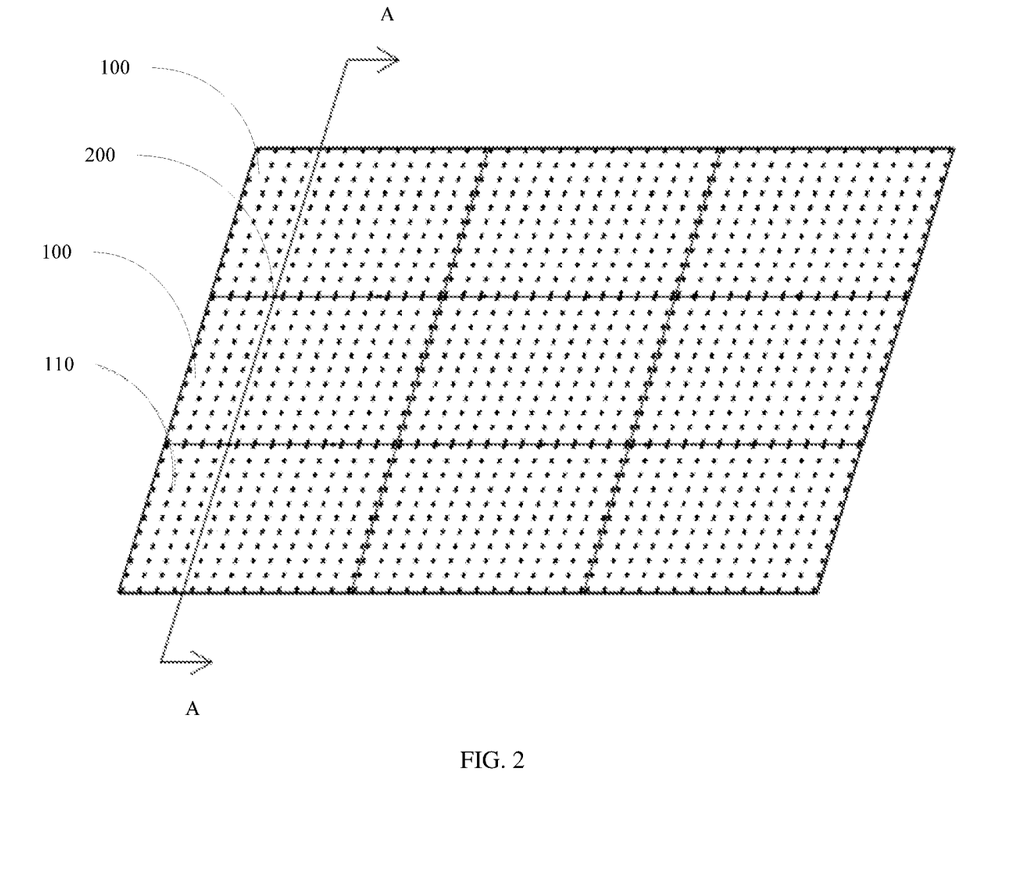
FIG. 2 is a schematic diagram of a plurality of lamp boards spliced on the backplane in the first embodiment of the backlight module proposed in the present application.
Figure 3:
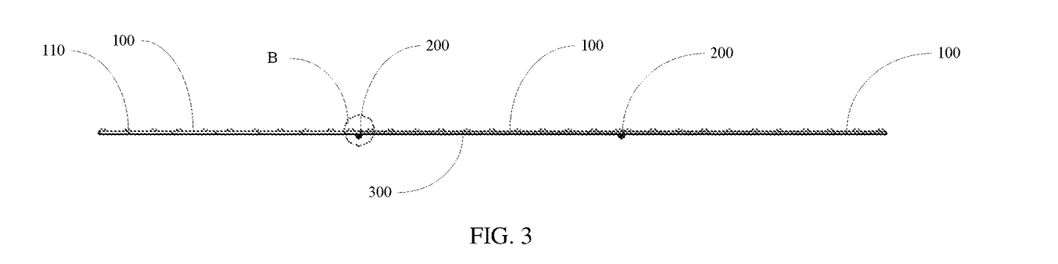
FIG. 3 is a sectional view along A-A line of FIG. 2.

Side edges of the overall periphery formed by the splicing of all lamp boards 100 can be fixed with the backplane 300 through an existing fixing method, or be fixed with the backplane 300 through the fasteners 200.

Restriction of displacement of the lamp board 100 in a direction parallel to the lamp board mounting side 310 can be realized by fixing the lamp board 100 and the backplane 300 through other existing fixing structures, or by setting a fastener 200 on each side of the lamp board 100 so that each side of the lamp board 100 is abutted against the above fastener 200.

In the above embodiment, after the fastener 200 is connected and fixed with the second connecting structure 320 on the lamp board mounting side 310 through the first connecting structure 240 on the fastener 200, the first limit portion 210 and the second limit portion 220 on the fastener 200 are respectively abutted against the sides of the lamp boards 100 on both sides of the fastener 200, and the lamp boards 100 on both sides of the fastener 200 are fixed by the same fastener 200 between them, which can reduce the number of fasteners 200, In addition, times of assembling the fastener 200 can be reduced, and the assembling is easier. In addition, the first connecting structure 240 and the second connecting structure 320 are connected and fixed on the lamp board installation side 310. When the lamp board 100 is assembled through the fastener 200, it can be assembled on the lamp board installation side 310 of the backplane 300. There is no need to install on both sides of the backplane 300, which makes the assembling easier. Especially in a large-size backlight module 13, the problem of inconvenient installation on both sides of the backplane 300 due to the large area of the backplane 300 can be overcome.

Figure 4:
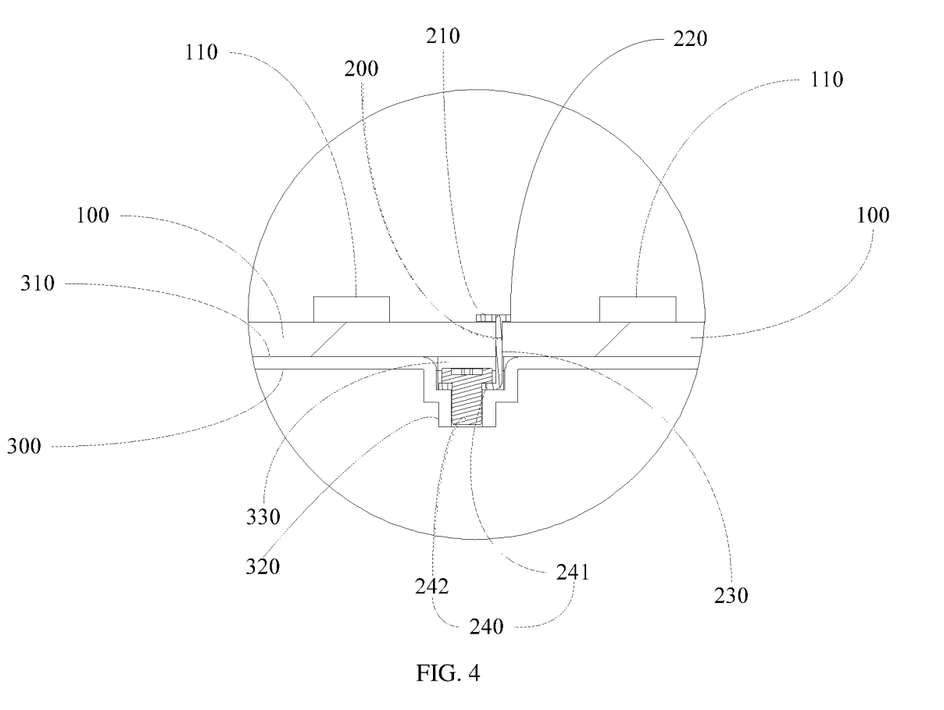
FIG. 4 is an enlarged view of Part B in FIG. 3.

According to FIG. 4, as a further embodiment based on the above embodiment, a portion of the lamp board mounting side 310, where the second connecting structure 320 is arranged, is provided with a groove 330, the second connecting structure 320 is arranged in the groove 330, and the first connecting structure 240 and the second connecting structure 320 are connected and fixed in the groove 330.

In the further embodiment based on the above embodiment, influence of the connection between the first connecting structure 240 and the second connecting structure 320 on an arrangement of the lamp board 100 can be avoided, a spacing between the two lamp boards 100 on both sides of the fastener 200 can be reduced, and the two lamp boards 100 fixed by the fastener 200 can fit a plane of the lamp board installation side 310.

According to FIG. 4, as a further embodiment based on the above embodiment, the first connecting structure 240 includes a mounting panel 241 and a bolt 242. The mounting panel 241 is arranged at a first end of the fastener 200, and the mounting panel 241 is provided with a mounting hole 243. The bolt 242 is engaged with the mounting hole 243. A second connecting structure 320 is a threaded hole arranged on the mounting side 310 of the lamp board. The threaded hole is adapted to the bolt 242. The bolt 242 passes through the mounting hole 243 and is threaded with the threaded hole to connect and fix the fastener 200 to the mounting side 310 of the lamp board.

When the lamp board mounting side 310 has a groove 330, the threaded hole is arranged in the groove 330, a length of the mounting panel 241 is not greater than a length of the groove 330 and a width of the mounting panel 241 is not greater than a width of the groove 330, and the mounting panel 241 and the bolt 242 are embedded in the groove 330 and threaded with the threaded hole.

In the further embodiment based on the above embodiment, the assembler can complete the assembly of the fastener 200 and the lamp board 100 only on the lamp board installation side 310, without operating on both sides of the backplane 300. In addition, the bolt 242 is firmly connected with the threaded hole, which is convenient for disassembly and assembly. The distance between a first limit portion 210 and a second limit portion 220 and the backplane 300 can be fine adjusted by adding shims, etc., so as to facilitate the installation of the lamp board 100.

According to FIG. 4, as a further embodiment based on the above embodiment, the mounting panel 241 and the first limit portion 210 are on a same side of the fastener 200.

In the further embodiment based on the above embodiment, a space occupied by the fastener 200 on the lamp board mounting side 310 can be reduced, which is conducive to an arrangement of the lamp boards 100.

As a further embodiment based on the above embodiment, the mounting hole 243 is outside a vertical projection of the first limit portion 210 on the mounting panel 241.

When to assemble the fastener 200 and the lamp board 100, the lamp board 100 is assembled on a side of the second limit portion 220 to make the second limit portion 220 of the fastener 200 abutted against the lamp board 100 on a side, then the fastener 200 is fixed on the backplane 300 by the bolt 242 passed through the mounting hole 243, and finally the first limit portion 210 of the fastener 200 is made abutted against the lamp board 100 on the side.

In the further embodiment based on the above embodiment, the first limit portion 210 will not block the mounting hole 243, and a connection between the bolt 242 and the threaded hole is more convenient. In addition, after the bolt 242 is connected to the backplane 300, the lamp board 100 installed on a side of the first limit portion 210 can cover the mounting hole 243, which can reduce the gap between the lamp boards 100 on both sides of the fastener 200.

Of course, the mounting hole 243 can also partially or wholly overlap a projection of the first limit portion 210 on the mounting panel 241, and the bolt 242 can be inserted into the mounting hole 243 through a space on the side of the first limit portion 210 and connected with the threaded hole.

According to FIG. 4, as a further embodiment based on the above embodiment, the fastener 200 includes a fixing body 230. The fixing body 230 is clamped between two adjacent lamp boards 100, the fixing body 230 has a first end and a second end opposite to the first end.

The first end of the fixing body 230 is provided with the first connecting structure 240, and opposite sides of the second end of the fixing body 230 are respectively formed with the first limit portion 210 and the second limit portion 220. The fixing body 230 is respectively abutted against the corresponding sides of the lamp boards 100 on both sides, the lamp boards 100 on both sides of the fixing body 230 are restricted to move toward the fixing body 230 to which they are abutted against.

In the further embodiment based on the above embodiment, a movement of the lamp board 100 parallel to a direction of the lamp board mounting side 310 can be restricted, so that the lamp board 100 can be fixed more firmly.

According to FIG. 4, as a further embodiment based on the above embodiment, the fixing body 230 is a panel-shaped body, and the sides of the fixing body 230 abutting against the lamp boards 100 on both sides are perpendicular to the lamp board mounting side 310.

In the further embodiment based on the above embodiment, the butting between the fixing body 230 and the lamp boards 100 on both sides is more stable, and the lamp boards 100 are more firmly fixed.

As a further embodiment based on the above embodiment, the two opposite sides of the second end of the fixing body 230 are folded to form a first folding structure and a second folding structure respectively. The first folding structure serves as the first limit portion 210 and the second folding structure serves as the second limit portion 220. When the fixing body 230 is a panel-shaped body, the first folding structure can be formed by folding a part of the panel body at the second end of the fixing body 230 towards one side, and the second folding structure can be formed by folding another part of the panel body at the second end of the fixing body 230 towards the other side.

The fastener 200 may be made of a panel-shaped hardware.

The first folding structure and the second folding structure are folded at a same height at the second end of the fixing body 230. Both the first folding structure and the second folding structure are parallel to a mounting surface of the lamp board 100, and distance from the first folding structure and the second folding structure to the mounting surface of the lamp board 100 are the same.

The mounting panel 241 may be formed by folding the first end of the fixing body 230, and mounting holes and bolts are provided on the folded mounting panel 241 to form the first connecting structure 240.

In a further embodiment based on the above embodiment, the fastener 200 is easy to be manufactured and materials is saved.

As a further embodiment based on the above embodiment, all lamp boards 100 are provided with lamp beads 110, and all lamp beads 110 in a light-emitting area are uniformly distributed.

Each lamp board 100 is provided with a plurality of lamp beads 110 distributed in a matrix. A distance between the lamp beads 110 on a side edge of the lamp board 100 and the lamp beads 110 on a corresponding side edge of a spliced lamp board 100 is equal to the distance between any two adjacent lamp beads 110 on each lamp board 100.

A thickness of the fixing body 230 can be adjusted so that the distance between the lamp beads 110 on a side edge of the lamp board 100 and the lamp beads 110 on the corresponding side edge of the spliced lamp board 100 is equal to the distance between any two adjacent lamp beads 110 on each lamp board 100.

In the further embodiment based on the above embodiment, an optical density output everywhere of the backlight module 13 can be made equal, and an optical effect can be improved.

The backlight module 13 can be configured for various ordinary LED display panels, and can further be configured for display panels using mini LED technology.

Figure 5:
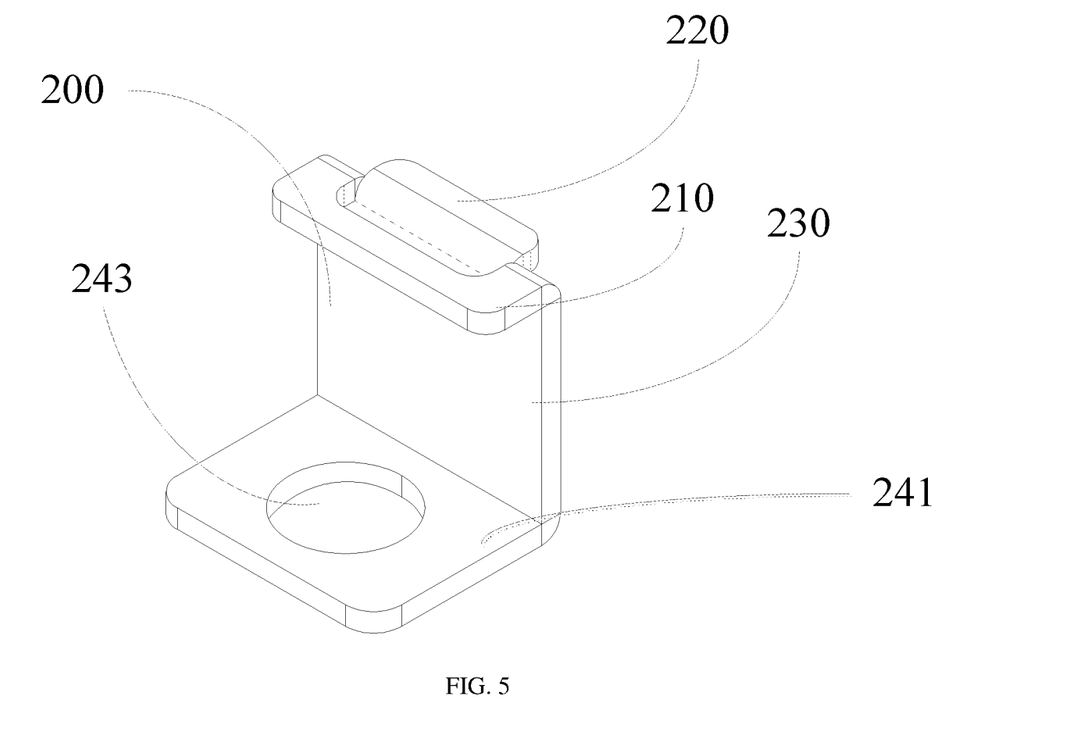
FIG. 5 is a schematic diagram of a fastener in embodiment 2 of the backlight module proposed in the application.

According to FIG. 5, in a second embodiment of the backlight module 13 proposed in the present application, a top view of the second folding structure may be of "U" shape, the first folding structure is a panel structure corresponding to a notch of the first folding structure, and the maximum distance from the first folding structure to the fixing body 230 is less than the distance from the mounting hole 243 to the fixing body 230. In addition, other technical features are the same as those in the first embodiment. At this time, it is convenient for the bolt 242 to be inserted into the mounting hole 243 and connected with the threaded hole 320.

Figure 6:
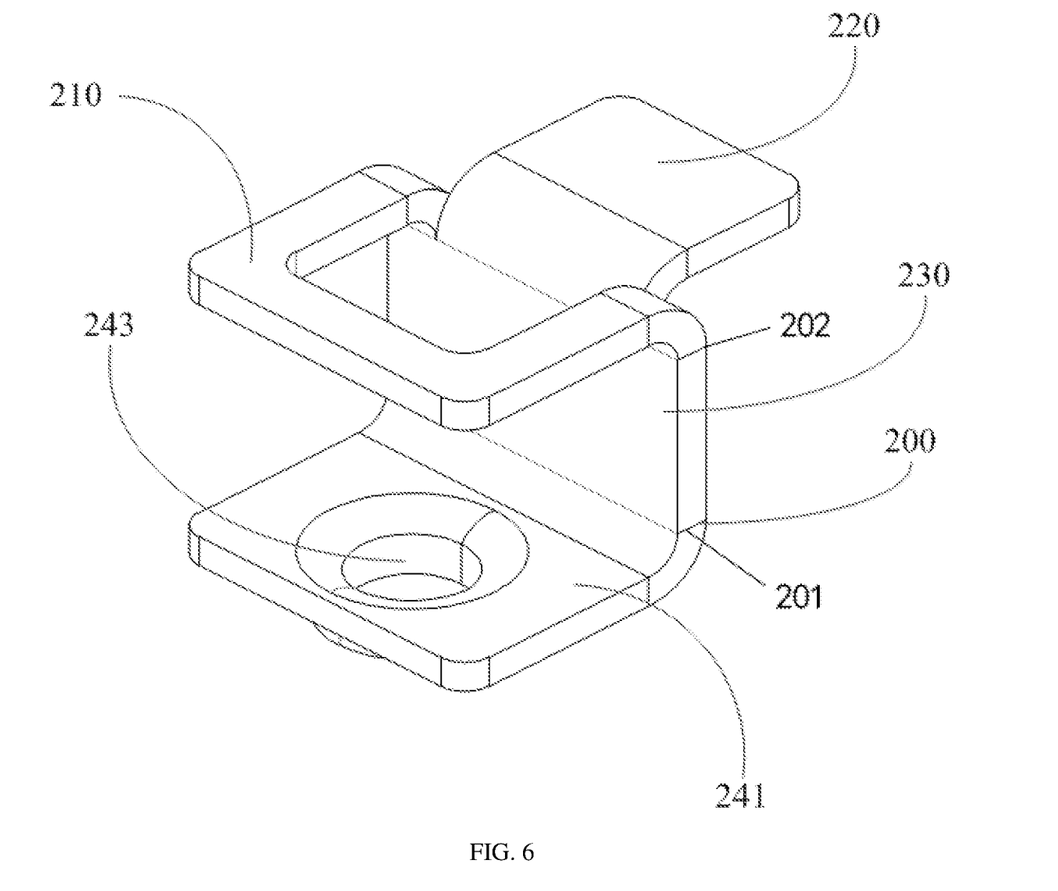
FIG. 6 is a schematic diagram of a fastener in embodiment 3 of the backlight module proposed in the application.

According to FIG. 6, in a third embodiment of the backlight module 13 proposed in the present application, a top view of the first folding structure can be "U" shaped, the mounting hole 243 on the mounting panel 241 is in a vertical projection of a notch of the first folding structure on the mounting panel 241, and the second folding structure is a panel-shaped structure corresponding to the notch of the first folding structure. In addition, other technical features are the same as those in the first embodiment. At this time, the first folding structure and the second folding structure have a large contact surface with the corresponding lamp board 100, and the butting is more stable.

Figure 7:
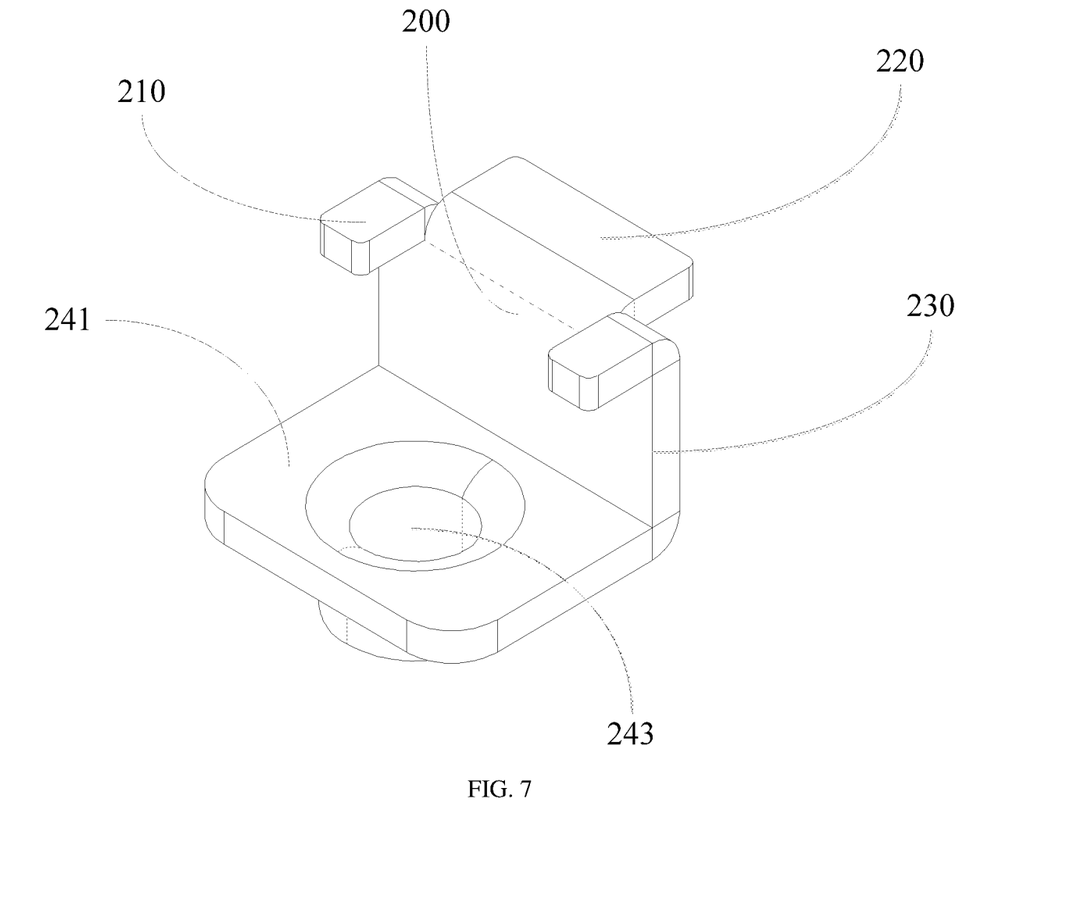
FIG. 7 is a schematic diagram of a fastener in embodiment 4 of the backlight module proposed in the application.

According to FIG. 7, in a fourth embodiment of the backlight module 13 proposed in the present application, the first folding structure can be two strip-shaped structures arranged at intervals, the mounting hole 243 is in a vertical projection of a gap between the two strip-shaped structures on the mounting panel 241, and the second folding structure is a panel-shaped structure corresponding to the gap between the two strip-shaped structures. In addition, other technical features are the same as those in the first embodiment. At this time, the first folding structure has little effect on the lamp board 100.

Figure 8:
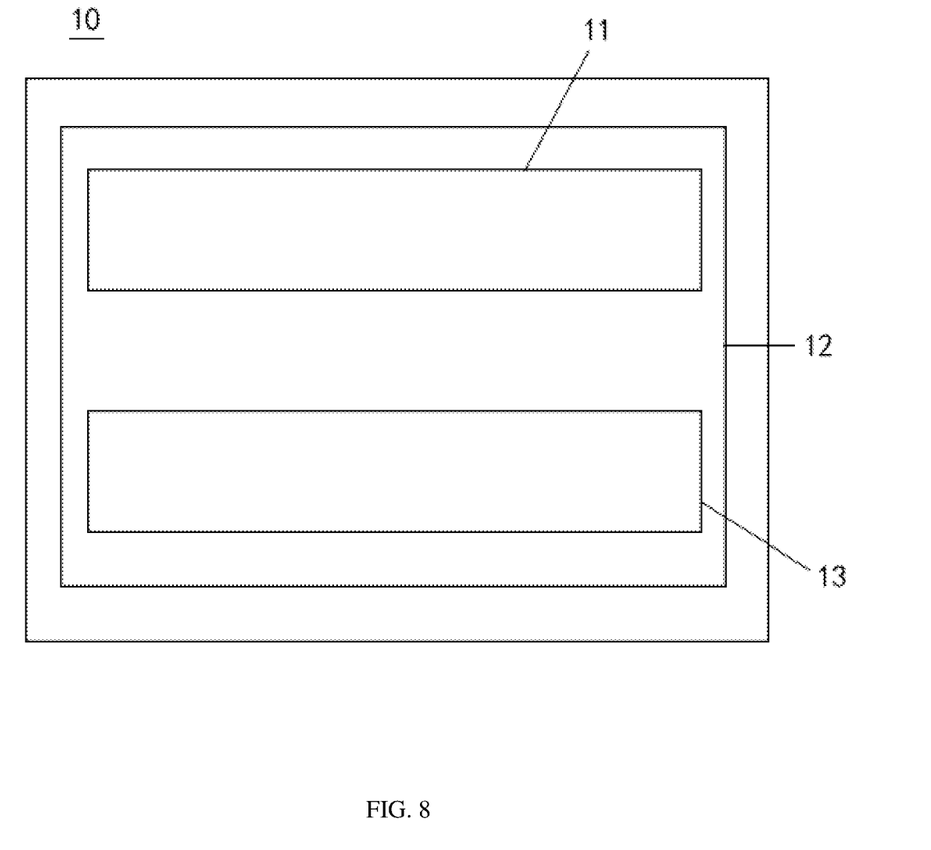
FIG. 8 is a frame diagram of a structure of the display device.

In the embodiment of the display device proposed in the present application, the display device includes a display module 11, a fixing frame 12 and the above backlight module 13. The display module 11 and the backlight module 13 are installed on the fixing frame 12, and the lamp boards emit lights toward the display module 11.

The backlight module 13 can be a variety of ordinary LED display panels, or a display panel adopting Mini LED technology.

Since the display device proposed in the present application adopts all the technical features of the embodiments of the above backlight module 13, it has at least all the beneficial effects brought by the embodiments of the above backlight module 13, which will not be described here.

The above is only an optional embodiment of the application, and does not limit the scope of the patent of the present application. Any equivalent structural transformation made by using the contents of the description and drawings of the application, or any direct/direct application in other relevant technical fields under the concept of the present application, is included in the claimed scope of the present application.

What is claimed is:

1. A backlight module, comprising:
a backplane having a lamp board installation side; and
a plurality of lamp boards spliced at the lamp board installation side to form a light-emitting area,
wherein the backlight module further comprises a fastener located between two adjacent lamp boards, the fastener has a first end and a second end opposite to the first end, the first end of the fastener has a first connecting structure, and two opposite sides of the second end of the fastener respectively comprise a first limit portion and a second limit portion;
wherein a second connecting structure corresponding to the first connecting structure is mounted on the lamp board installation side, the fastener is connected and fixed on the lamp board installation side through the first connecting structure and the second connecting structure, and the first limit portion and the second limit portion are respectively abutted against a side of the two adjacent lamp boards on both sides of the fastener to restrict the sides of the two adjacent lamp boards on both sides of the fastener from moving away from the backplane;
wherein the first connecting structure comprises: a mounting panel mounted at the first end of the fastener and having a mounting hole, and a bolt adapted to the mounting hole; and
wherein the second connecting structure is a threaded hole arranged on the lamp board installation side, the threaded hole is adapted to the bolt, and the bolt is threaded with the threaded hole after passing through the mounting hole to connect and fix the fastener on the mounting side of the lamp board.

2. The backlight module according to claim 1, wherein the lamp board installation side has a groove corresponding to the second connecting structure, the second connecting structure is mounted in the groove, and the first connecting structure and the second connecting structure are connected and fixed in the groove.

3. The backlight module according to claim 1, wherein the mounting panel and the first limit portion are on a same side of the fastener.

4. The backlight module according to claim 3, wherein the mounting hole is outside a vertical projection of the first limit portion on the mounting panel.

5. The backlight module according to claim 1, wherein the fastener comprises:

a fixing body clamped between the two adjacent lamp boards, wherein the fixing body has a first end and a second end opposite to the first end, the first end of the fixing body is provided with the first connecting structure, two opposite sides of the second end of the fixing body are respectively formed with the first limit portion and the second limit portion, and the fixing body is respectively abutted against the corresponding sides of the two adjacent lamp boards on both sides of the fixing body to restrict a movement of the two adjacent lamp boards towards the fixing body.

6. The backlight module according to claim 5, wherein the fixing body is a panel-shaped body, and butting sides of the fixing body and the two adjacent lamp boards are perpendicular to the lamp board installation side.

7. The backlight module according to claim 5, wherein the two opposite sides of the second end of the fixing body are respectively folded to form a first folding structure and a second folding structure, the first folding structure is the first limit portion, and the second folding structure is the second limit portion.

8. The backlight module according to claim 1, wherein all the lamp boards are provided with lamp beads, and all the lamp beads in the light-emitting area are evenly distributed.

9. A display device comprising a display module, a fixing frame and a backlight module, wherein the display module and the backlight module are installed on the fixing frame, and a lamp board is configured to emit light towards the display module, wherein the backlight module comprises:

a backplane having a lamp board installation side; and a plurality of lamp boards spliced at the lamp board installation side to form a light-emitting area, wherein there are a fastener between two adjacent lamp boards, the fastener has a first end and a second end opposite to the first end, the first end of the fastener has a first connecting structure, and two opposite sides of the second end of the fastener are respectively provided with a first limit portion and a second limit portion;

wherein a second connecting structure corresponding to the first connecting structure is arranged on the lamp board installation side, the fastener is connected and fixed on the lamp board installation side through the first connecting structure and the second connecting structure, and the first limit portion and the second limit portion are respectively abutted against sides of the two adjacent lamp boards on both sides of the fastener to restrict the sides of the two adjacent lamp boards on both sides of the fastener from moving away from the backplane;

wherein the first connecting structure comprises: a mounting panel arranged at the first end of the fastener and provided with a mounting hole, and a bolt adapted to the mounting hole; and wherein the second connecting structure is a threaded hole arranged on the lamp board installation side, the threaded hole is adapted to the bolt, and the bolt is threaded with the threaded hole after passing through the mounting hole to connect and fix the fastener on the mounting side of the lamp board.

10. The display device according to claim 9, wherein the lamp board installation side is provided with a groove corresponding to the second connecting structure, the second connecting structure is arranged in the groove, and the first connecting structure and the second connecting structure are connected and fixed in the groove.

11. The display device according to claim 9, wherein the mounting panel and the first limit portion are on a same side of the fastener.

12. The display device according to claim 11, wherein the mounting hole is outside a vertical projection of the first limit portion on the mounting panel.

13. The display device according to claim 9, wherein the fastener comprises:

a fixing body clamped between the two adjacent lamp boards, wherein the fixing body has a first end and a second end opposite to the first end, the first end of the fixing body is provided with the first connecting structure, two opposite sides of the second end of the fixing body are respectively formed with the first limit portion and the second limit portion, and the fixing body is respectively abutted against the corresponding sides of the two adjacent lamp boards on both sides of the fixing body to restrict a movement of the two adjacent lamp boards towards the fixing body.

14. The display device according to claim 13, wherein the fixing body is a panel-shaped body, and butting sides of the fixing body and the two adjacent lamp boards are perpendicular to the lamp board installation side.

15. The display device according to claim 13, wherein the two opposite sides of the second end of the fixing body are respectively folded to form a first folding structure and a second folding structure, the first folding structure is the first limit portion, and the second folding structure is the second limit portion.

16. The display device according to claim 9, wherein all the lamp boards are provided with lamp beads, and all the lamp beads in the light-emitting area are evenly distributed.

* * * * *

UNITED STATES PATENT AND TRADEMARK OFFICE
CERTIFICATE OF CORRECTION

PATENT NO. : 11,947,157 B2  
APPLICATION NO. : 17/875795  
DATED : April 2, 2024  
INVENTOR(S) : Taixin Cao, Hsu Kang Lo and Haoxuan Zheng Page 1 of 1

It is certified that error appears in the above-identified patent and that said Letters Patent is hereby corrected as shown below:

On the Title Page

Item [73], Assignees, change "BEIHAI HKC OPTOELECTRONICS TECHNOLOGY C0., LTD." to --BEIHAI HKC OPTOELECTRONICS TECHNOLOGY CO., LTD.--

Signed and Sealed this  
Fourteenth Day of May, 2024

Katherine Kelly Vidal  
*Director of the United States Patent and Trademark Office*